United States Patent
Roth et al.

(10) Patent No.: US 10,240,525 B2
(45) Date of Patent: Mar. 26, 2019

(54) VARIABLE COMPRESSION RATIO CONNECTING ROD SYSTEM WITH ROTARY ACTUATOR

(71) Applicant: BorgWarner Inc., Auburn Hills, MI (US)

(72) Inventors: David B. Roth, Groton, NY (US); Christopher J. Pluta, Lansing, NY (US); Paul A. Darsky, Marathon, NY (US); Daniel Brown, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/310,115

(22) PCT Filed: May 4, 2015

(86) PCT No.: PCT/US2015/028988
§ 371 (c)(1),
(2) Date: Nov. 10, 2016

(87) PCT Pub. No.: WO2015/179112
PCT Pub. Date: Nov. 26, 2015

(65) Prior Publication Data
US 2017/0241333 A1    Aug. 24, 2017

Related U.S. Application Data

(60) Provisional application No. 62/000,997, filed on May 20, 2014.

(51) Int. Cl.
*F02B 75/04* (2006.01)
*F16C 7/06* (2006.01)

(52) U.S. Cl.
CPC ............ *F02B 75/045* (2013.01); *F02B 75/04* (2013.01); *F02B 75/048* (2013.01); *F16C 7/06* (2013.01)

(58) Field of Classification Search
CPC ...... F02B 75/04; F02B 75/045; F02B 75/048; F02D 15/02
(Continued)

(56) References Cited

U.S. PATENT DOCUMENTS 2,427,668 A    9/1947   Gill
5,370,093 A    12/1994   Hayes
(Continued)

FOREIGN PATENT DOCUMENTS

CN    102465770 A    5/2012
DE    4226361 A1    4/1994
(Continued)

OTHER PUBLICATIONS

International Search Report for Application No. PCT/US2015/028988 dated Aug. 10, 2015, 2 pages.
(Continued)

*Primary Examiner* — Syed O Hasan
(74) *Attorney, Agent, or Firm* — Howard & Howard Attorneys PLLC

(57) ABSTRACT

A variable compression connecting rod system (10) located in an internal combustion engine (12) and a method of assembly can include a connecting rod (28) mountable to a piston pin (26) having a first longitudinal axis at one end and 5 mountable to a crankpin (22) having a second longitudinal axis at a second end portion (36). A hydraulically actuated eccentric rotor (52) rotatable about one of the first and second longitudinal axis. The eccentric rotor (52) including first and second vanes (54*a*, 54*b*) for driving the rotor between first and second angular positions in response to
(Continued)

fluid pressure acting on the first and second vanes. The eccentric rotor 10 (52) having an eccentric surface area with different radial distances (80, 82) movable into alignment with a longitudinal axis of the connecting rod (28) for varying a longitudinal length of the connecting rod (28) between the first and second longitudinal axis.

14 Claims, 8 Drawing Sheets

(58) Field of Classification Search
USPC .............................................. 123/48 R, 48 B
See application file for complete search history.

(56) References Cited

U.S. PATENT DOCUMENTS

| | | | |
|---|---|---|---|
| 5,417,185 A | 5/1995 | Beattie | |
| 6,772,721 B1 | 8/2004 | Gardner et al. | |
| 6,966,279 B2 | 11/2005 | Sidor | |
| 6,997,150 B2 | 2/2006 | Simpson | |
| 7,255,077 B2 | 8/2007 | Simpson et al. | |
| 7,814,881 B2 | 10/2010 | McRae | |
| 7,891,334 B2 | 2/2011 | O'Leary | |
| 8,146,551 B2 | 4/2012 | Pluta | |
| 8,371,263 B2 | 2/2013 | Knudsen et al. | |
| 8,387,573 B2 | 3/2013 | Lee et al. | |
| 8,393,307 B2 | 3/2013 | Lee et al. | |
| 8,468,997 B2 | 6/2013 | Wilkins | |
| 8,539,917 B2 | 9/2013 | Lee | |
| 8,561,583 B2 | 10/2013 | Butterfield | |
| 8,602,002 B2 | 12/2013 | Brennan | |
| 8,776,736 B2 * | 7/2014 | Woo | F02B 75/045 123/48 A |
| 8,851,030 B2 | 10/2014 | von Mayenburg | |
| 2006/0086332 A1 | 4/2006 | Simpson et al. | |
| 2011/0108006 A1 | 5/2011 | Lee et al. | |
| 2011/0126806 A1 | 6/2011 | Lee et al. | |
| 2013/0180486 A1 | 7/2013 | Smith | |
| 2013/0206088 A1 | 8/2013 | Wigsten | |
| 2013/0247879 A1 * | 9/2013 | von Mayenburg | F02B 75/045 123/48 B |
| 2014/0007848 A1 * | 1/2014 | Pluta | F02B 75/041 123/48 R |
| 2015/0233288 A1 * | 8/2015 | Paul | F02B 75/045 123/48 B |

FOREIGN PATENT DOCUMENTS

| | | |
|---|---|---|
| JP | H 05-66240 U | 9/1993 |
| KR | 10-2011-0037392 A | 4/2011 |
| KR | 1020110037392 * | 4/2011 |
| WO | 2014099374 A1 | 6/2014 |

OTHER PUBLICATIONS

Machine-assisted English translation for JPH 05-66240 extracted from espacenet.com database on Jan. 2, 2017, 16 pages.

English language abstract and machine-assisted English translation for KR 10-2011-0037392 extracted from Thomson Innovation.com database on Oct. 31, 2016, 12 pages.

English language abstract for CN 102465770 extracted from espacenet.com database on Sep. 6, 2018, 2 pages.

English language abstract and machine-assisted English translation for DE 42 26 361 extracted from espacenet.com database on Sep. 6, 2018, 16 pages.

* cited by examiner

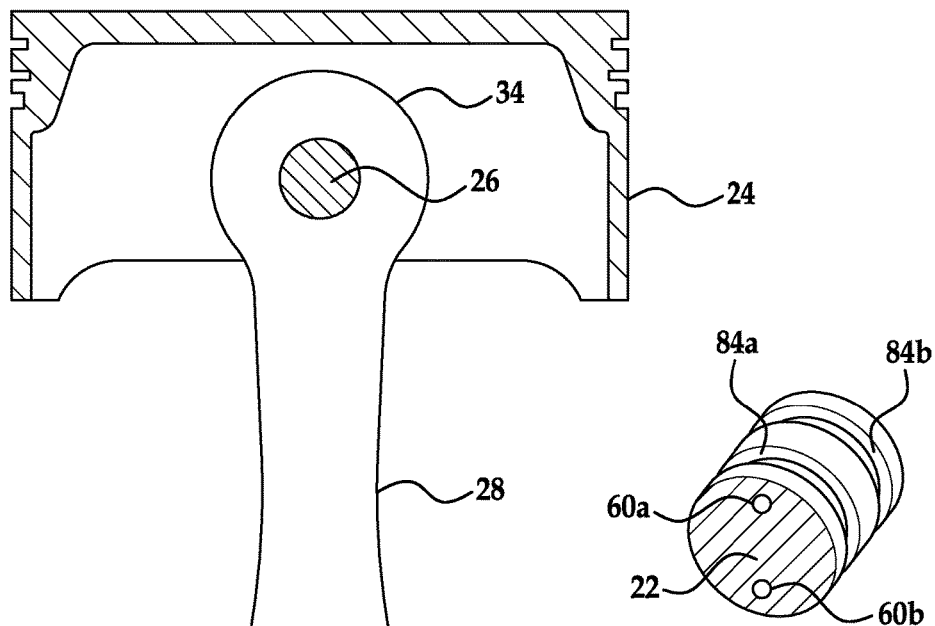
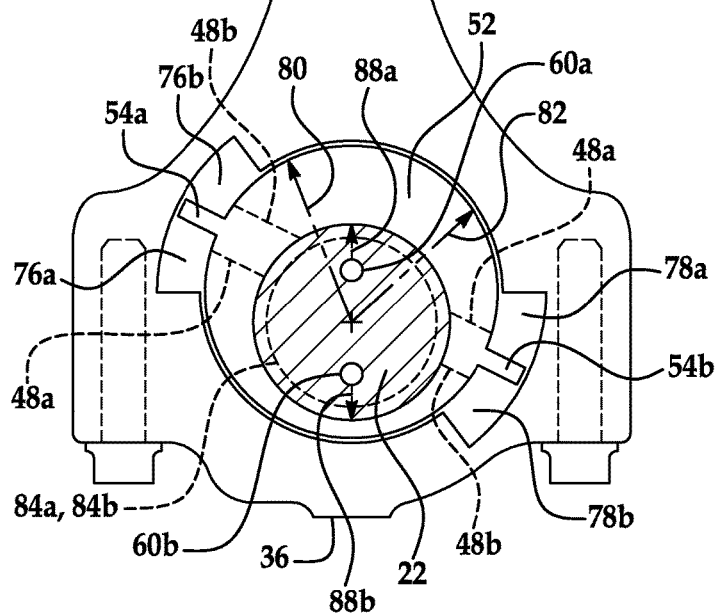
FIG. 7
FIG. 6

VARIABLE COMPRESSION RATIO CONNECTING ROD SYSTEM WITH ROTARY ACTUATOR

FIELD OF THE INVENTION

The invention relates to internal combustion engines, and more particularly, to an internal combustion engine with a variable length connecting rod for selectively varying a length of a stroke of a piston within a cylinder.

BACKGROUND

An internal combustion engine can include at least one cylinder and a plurality of intake valves and exhaust valves for operation. An internal combustion engine can include four cycles or strokes including an intake stroke, a compression stroke, an ignition/combustion/power stroke, and an exhaust stroke. During the intake stroke, the intake valve is opened and a piston can travel away from a cylinder head allowing a fuel and air mixture to enter the combustion chamber of the cylinder. During the compression stroke, the intake valves can be closed and the piston can reciprocate back toward the cylinder head for compressing the fuel and air mixture. During the power stroke, the fuel and air mixture can be ignited for forming a high-pressure gas delivering power to force the piston away from the cylinder head of the cylinder and rotate a crankshaft. During the exhaust stroke, the exhaust valve can be opened and the piston can move back towards the cylinder head causing the combusted fuel/air mixture of the high-pressure gas to be emitted as exhaust. Generally, the distance traveled by the piston during the intake and compression cycles is the same distance as traveled by the piston during the power and exhaust cycles, such that the volume of all four cycles is equal. The compression ratio, or the ratio of the travel distance of the piston at the end of the intake stroke and the beginning of the compression stroke to the travel distance at the beginning of the intake stroke and the end of the compression stroke, is preferably 8:1. It can be desirable to alter the engine cycle such that the volume of the power and exhaust cycles is greater than the volume of the intake and compression cycles for increasing the efficiency of the engine. Varying the engine cycle can require varying the length of the distance between the piston and the crankshaft, allowing the reciprocating motion of the piston within the cylinder to change between a minimum distance and a maximum distance, and thus, changing the compression ratio. Current variable compression systems use connecting rods extending between the piston and the crankshaft or a camshaft associated with the crankshaft. The connecting rods can require additional linkage for effectively changing the length of the connecting rods or the distance between the piston and the crankshaft. Variable compression connecting rod systems have been disclosed in U.S. Pat. No. 8,602,002; U.S. Pat. No. 8,468,997; U.S. Pat. No. 8,371,263; U.S. Pat. No. 7,891,334; U.S. Pat. No. 7,814,881; U.S. Pat. No. 6,966,279; and U.S. Pat. No. 5,370,093.

SUMMARY

It can be desirable to eliminate the additional linkage used in known variable compression system connecting rod assemblies. To overcome the limitation of current technology, a variable compression connecting rod system disclosed herein can include at least one internally located hydraulic eccentric rotary actuator rotatable between first and second angular positions providing a minimum length and a maximum length of the corresponding connecting rod for changing the effective distance between a piston pin and a crankpin of a crankshaft. The disclosed variable compression connecting rod system can include a connecting rod having a first end portion with a first aperture for connection with a piston pin and a second end portion with a second aperture for connection with a crankpin of a crankshaft. The connecting rod can extend between the first and second end portions.

A variable compression connecting rod system can include a piston pin defining a piston pin axis, a crankpin defining a crankpin axis, and a source of pressurized fluid. The piston pin axis and the crankpin axis can define a first and second longitudinal axis, respectively. A connecting rod can have a first end associated with the piston pin and a second end located distally opposite the first end and associated with the crankpin. A hydraulically actuated eccentric rotor can be rotatable about at least one of the first and second longitudinal axes associated with at least one of the first and second end. The eccentric rotor can be operable in response to fluid communication with at least one expandable chamber defined between the eccentric rotor and the connecting rod for rotating the eccentric rotor between first and second angular positions. The eccentric rotor can be rotatable in response to fluid pressure action acting on the eccentric rotor for varying a distance between the first and second longitudinal axes.

A variable compression connecting rod system can include a piston pin defining a piston pin axis, a crankpin defining a crankpin axis, and a source of pressurized fluid. The connecting rod system can include a connecting rod having a first end associated with the piston pin and a second end located distally opposite the first end and associated with the crankpin. A hydraulically actuated eccentric rotor can be rotatable about at least one of the piston pin axis and the crankpin axis associated with at least one of the first and second end between first and second angular positions. A first expandable chamber and a second expandable chamber can be defined between the connecting rod and the eccentric rotor. The eccentric rotor can be rotatable in a clockwise direction and a counterclockwise direction in response to fluid pressure acting on the eccentric rotor within the corresponding first and second expandable chamber. The eccentric rotor can have different radial distances aligned with a longitudinal axis of the connecting rod when in the first and second angular positions for varying the longitudinal length of the connecting rod between the piston pin axis and the crankpin axis. At least one fluid conduit can be provided allowing fluid communication between the first and second expandable chamber and the source of pressurized fluid.

A method of assembling a variable compression connecting rod system can include forming a connecting rod to be mountable with respect to a piston pin and a crankpin. The connecting rod can have a first end to be associated with the piston pin and a second end located distally opposite the first end to be associated with the crankpin. The piston rod can have an eccentric-rotor-receiving aperture formed therein. The method can include inserting at least one hydraulically actuated eccentric rotor to be rotatable about at least one of the piston pin axis and crankpin axis associated with at least one of the first and second end. The eccentric rotor can be operable in response to fluid communication with at least one expandable chamber defined between the eccentric rotor and the connecting rod for rotating the eccentric rotor. The eccentric rotor can have different radial distances movable into alignment with a longitudinal axis of the connecting rod in response to fluid pressure action acting on the eccentric rotor for varying a longitudinal length of the connecting rod between the piston pin axis and the crankpin axis. The method can include forming at least one fluid conduit allowing fluid communication between the at least one expandable chamber and a source of pressurized fluid.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 6 is an elevational view of a connecting rod with a sealing cover removed having a first end portion associated with a piston pin and a second end portion associated with a crankpin, where the second end portion supports a hydraulically actuated eccentric rotor for movement between a first angular position and a second angular position to change an effective length of the connecting rod;

FIG. 7 is a perspective cross sectional detail of pressurized fluid passages and grooves formed with respect to the crankpin;

DETAILED DESCRIPTION

Figure 1:
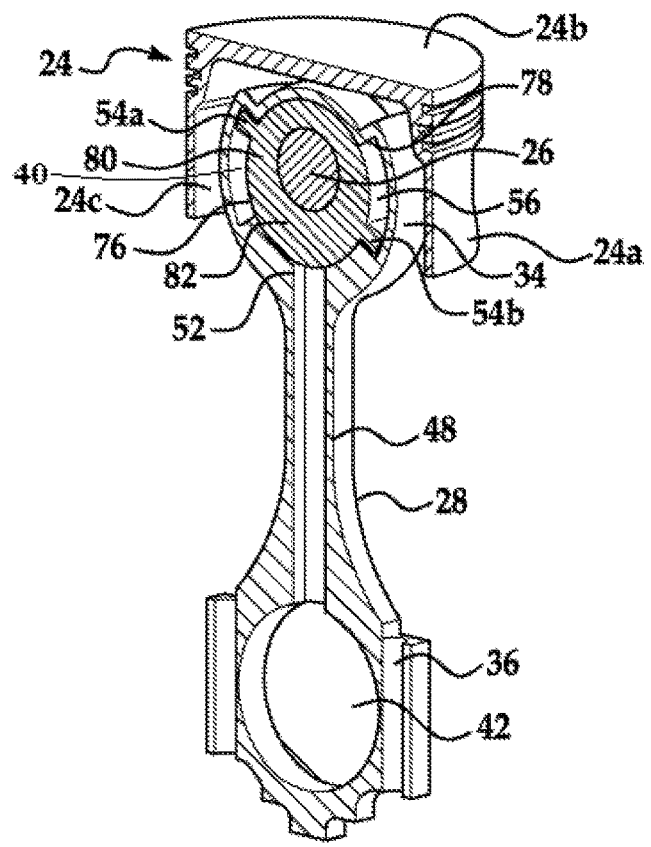
FIG. 1 is a cross sectional view of a connecting rod having first end portion associated with a piston pin and second end portion associated with a crankpin, where the first end portion supports a hydraulically actuated eccentric rotor for movement between a first angular position and a second angular position to change an effective length of the connecting rod.

Referring now to FIGS. 1-6, a variable compression connecting rod system 10 can include a connecting rod 28, a first end portion 34 and a second end portion 36 located at a first end 30 and a second end 32 of the connecting rod 28, respectively, and a hydraulically actuated eccentric rotor 52. The connecting rod 28 can be connected to a crankshaft 20 through a connecting rod bearing 50. The variable compression connecting rod system 10 can be used in an internal combustion engine 12. The internal combustion engine 12 can include a reciprocating piston internal combustion engine. The engine 12 can include an engine block 14 defining at least one cylinder 16. By way of example and not limitation, the engine block 14 can include two or more cylinders and can include a two-stroke operation, a four-stroke operation, or any number of strokes, as known to those skilled in the art.

The engine 12 can include at least one piston 24 corresponding to the at least one cylinder 16. The engine block 14 can include a plurality of bearings for receiving a crankshaft 20, such that the crankshaft 20 can rotate relative to the engine block 14. The crankshaft 20 can include a plurality of crank counterweights (not shown) for providing rotational balance of the crankshaft 20 when assembled. The at least one piston 24 can be coupled to the crankshaft 20 through a connecting rod 28. The at least one piston 24 can include a head surface 24b, an underside surface 24c, and a piston skirt 24a. The head surface 24b can face a location where fuel is combusted in a combustion chamber 18 defined by the at least one cylinder 16. The at least one cylinder 16 and the underside surface 24c can be located distally opposite the head surface 24b. The piston skirt 24a can connect the head surface 24b and the underside surface 24c and can be disposed adjacent the engine block 14 forming the at least one cylinder 16. The crankshaft 20 can define at least one crankpin 22 corresponding to the at least one piston 24. The at least one crankpin 22 can be circular in cross-section. The at least one piston 24 can include a piston pin 26 having a piston pin axis and can be operable for reciprocal movement within the at least one cylinder 16 during an engine stroke. The piston pin axis can define a first longitudinal axis. The at least one piston 24 can vary a volume of the at least one cylinder 16 by moving between a first end limit and second end limit of reciprocation within the at least one cylinder 16 during an engine stroke.

The connecting rod 28 can have a first end 30 associated with the at least one piston 24 and a second end 32 located distally opposite the first end 30 and associated with the crankshaft 20. The connecting rod 28 can define at least one fluid conduit 48, 48a, 48b extending between the first and second ends 30, 32. The first and second end portions 34, 36 can be located at the first and second ends 30, 32 of the connecting rod 28, respectively. The first end portion 34 can be connected to a piston operable for reciprocal movement within the at least one cylinder 16 and can define a first aperture 40 for receiving the piston pin 26. The first end portion 34 can be reciprocated within the at least one cylinder 16 for driving the at least one piston 24 between the first and second end limits of movement. The second end portion 36 can define a second aperture 42. A connecting rod bearing 50 can mount the second end portion 36 to the crankshaft 20 and can receive the at least one crankpin 22. A connecting rod bearing 50 can be interposed between the connecting rod 28 and the crankpin 22. The crankpin 22 can have a crankpin axis. The crankpin axis can define a second longitudinal axis with respect to the first longitudinal axis. As illustrated in FIGS. 4A-5B, at least one fluid passage 60a, 60b, 88a, 88b can be provided through the crankshaft 20 for fluid communication through the crankpin 22 with the at least one fluid conduit 48, 48a, 48b in fluid communication with at least one expandable fluid chamber 76a, 76b; 78a, 78b. The second end portion 36 can be rotatable with respect to the crankpin 22. The hydraulically actuated eccentric rotor 52 can be associated with one of the first and second end portions 34, 36, or a separate rotor 52 can be provided for each of the first and second end portions 34, 36 if desired, to be rotatable about a corresponding one of the first and second longitudinal axes. The eccentric rotor 52 can be operable in response to fluid communication through at least one fluid passage 23, 23a, 23b located in engine block 14. At least one chamber 76, 78 can be defined by the eccentric rotor 52 and the connecting rod 28. The eccentric rotor 52 can have at least one vane 54a, 54b located on an exterior surface 56 to defining at least one chamber 76, 78 located between the connecting rod 28 and the eccentric rotor 52. Fluid communication between the at least one fluid conduit 48, 48a, 48b and one expandable chamber portion 76a, 76b; 78a, 78b of the chambers 76, 78 can rotate the eccentric rotor 52 in a clockwise or counterclockwise direction in response to fluid pressure acting against the eccentric rotor 52. The eccentric rotor 52 can have an eccentric surface area with different radial distances 80, 82, as best seen in FIG. 6, rotatable in response to fluid pressure acting on the eccentric rotor for varying the effective distance between the first and second longitudinal axes.

Figure 3:
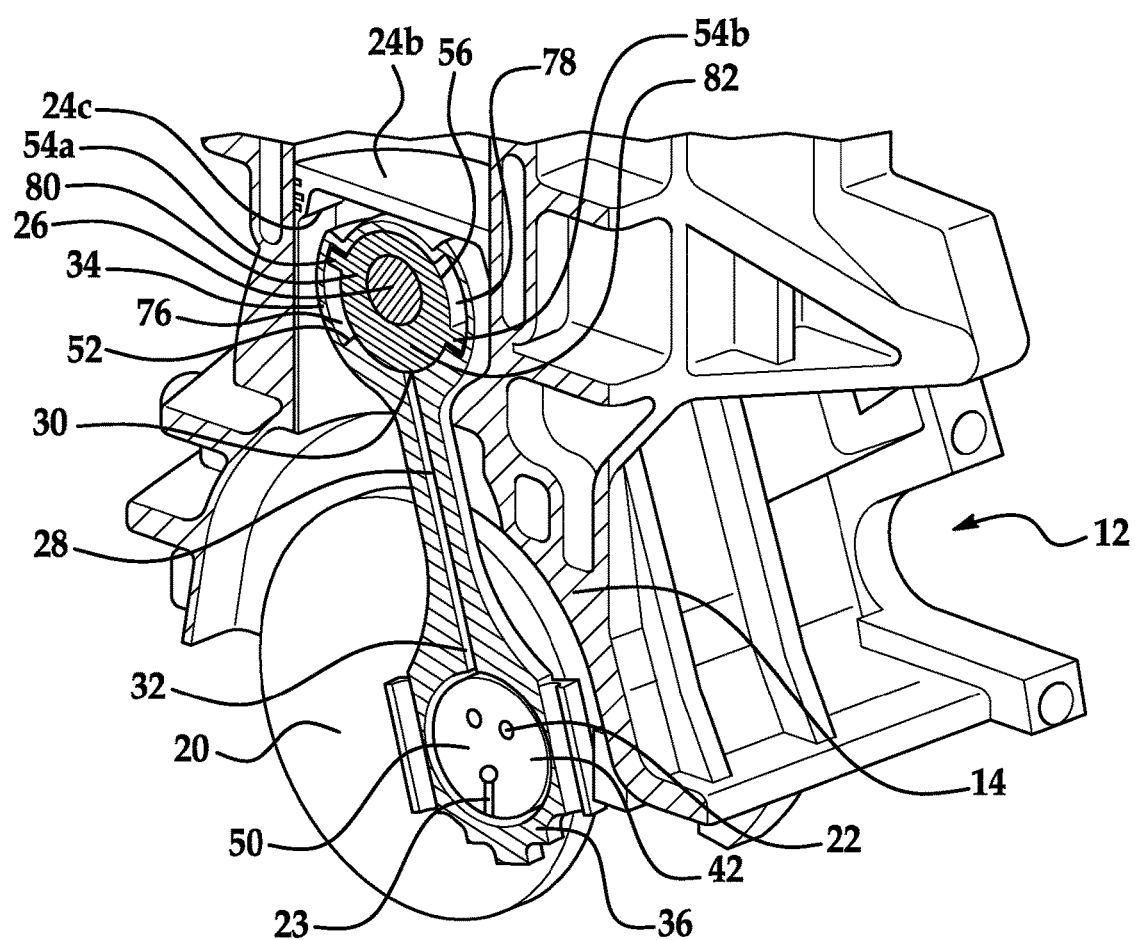
FIG. 3 is a cross sectional view of the variable compression connecting rod system located within an internal combustion engine, the connecting rod connected to a piston pin at the first end portion and connected to a crankpin at the second end portion.

Referring now to FIGS. 1 and 3, an eccentric rotor 52 can include a first and second vane 54a, 54b disposed on an exterior surface 56 of the eccentric rotor 52. The first and second vane 54a, 54b can be located approximately 180° apart. By way of example and not limitation, the eccentric rotor 52 can be associated with a first end portion 34 and mounted concentrically with a piston pin 26. A first and second chamber 76, 78 can be defined between the first end portion 34 and the eccentric rotor 52. Each of the first and second vane 54a, 54b can be rotatable within a corresponding one of the first and second chamber 76, 78. The first and second vane 54a, 54b can be rotatable to drive the rotor in a clockwise or counterclockwise direction. The eccentric rotor 52 can be rotated within the first end portion 34 in a clockwise or counterclockwise direction between a first rotor position and a second rotor position. The first rotor position can be defined by a first radial distance 80 of the eccentric surface area of the eccentric rotor 52 rotated into a position located at the first end 30 of the connecting rod 28 to provide a minimum connecting rod length. The second rotor position can be defined by a second radial distance 82 of the eccentric surface area of the eccentric rotor 52 rotated into a position located at the first end 30 of the connecting rod 28 providing a maximum connecting rod length. The first and second radial distances 80, 82 of the eccentric rotor 52 can be rotatable in response to communication of fluid pressure with one of the expandable chamber portions 76a, 76b; 78a, 78b of the chambers 76, 78 for driving rotation of the eccentric rotor 52 by applying pressure to one side of the first and second vanes 54a, 54b. The first and second vane 54a, 54b can be rotatable within one of the at least one chamber 76, 78 by fluid pressure within one expandable chamber side of the at least one chamber 76, 78, while the other side is in fluid communication to discharge into a fluid sump. By way of example and not limitation, as illustrated in FIG. 1 the connecting rod 28 can define a fluid conduit 48 extending between the first end portion 34 and a second end portion 42. The second end portion 42 can receive a connecting rod bearing 50 for mounting the second end portion 42 to a crankshaft 20 on a corresponding crankpin 22 defined by the crankshaft 20. The crankpin 22 can include at least one fluid passage 60a, 60b for fluid communication with the at least one fluid conduit 48a, 48b. Actuation of the eccentric rotor 52 can occur when fluid pressure flows from the at least one fluid passage 60a, 60b, through the fluid conduit 48a, 48b, and into one of the expandable chamber portions 76a, 76b; 78a, 78b of the at least one chamber 76, 78. More than one fluid conduit can extend between the first and second end 30, 32 of the connecting rod 28. The fluid pressure received by one expandable chamber side 76a, 76b; 78a, 78b of the at least one chamber 76, 78 can drive the eccentric rotor 52 in either a clockwise direction or a counterclockwise direction between the first and second angular positions of the eccentric rotor 52.

Referring now to FIGS. 6-7, the eccentric rotor 52 having a first and second vane 54a, 54b can be associated with a second end portion 36 and concentrically mounted with a crankpin 22 mounting the second end portion 36 to a crankshaft 20. A first expandable chamber 76a and a second expandable chamber 76b are located on opposite sides of the first vane 54a and enclosed by the second end portion 36 of the connecting rod 28. By way of example and not limitation, as illustrated in FIG. 6, the rotor 52 can rotate clockwise in response to fluid pressure expanding the first expandable chamber 76a against the first vane 54a, and can rotate counterclockwise in response to fluid pressure expanding the second expandable chamber 76b against the first vane 54a. A corresponding pair of first and second expandable chamber 78a, 78b can be located on opposite sides of the second vane 54b, such that the second vane 54b can rotate clockwise and counterclockwise in response to fluid pressure acting on the second vane 54b to expand the first and second expandable chamber 78a, 78b respectively. Fluid passages can be provided for selectively pressurizing and depressurizing the expandable chambers 76a, 76b; 78a, 78b and rotating the eccentric rotor 52. As illustrated in FIG. 6, a first fluid passage 48a can be in fluid communication with the first expandable chambers 76a, 78a and a second fluid passage 48b can be in fluid communication with the second expandable chambers 76b, 78b. The first and second radial distances 80, 82 of the eccentric surface area of the eccentric rotor 52 can be driven into alignment with a longitudinal length of the connecting rod 28 by rotation of the eccentric rotor 52 for changing the effective distance between the first and second longitudinal axes. As best illustrated in FIGS. 4A-5B and 7, additional fluid passages 60a, 60b can be formed in the crankshaft 20 and can extend through the crankpin 22 for fluid communication with separate, independent, first and second annular grooves 84c, 84d formed in the connecting rod 28, through short passages 88a, 88b extending through the crankpin 22 respectively. As illustrated in FIGS. 4A-5B, the first and second annular grooves 84c, 84d fluidly communicate separately and independently with the first and second fluid passages 48a, 48b respectively formed in the connecting rod 28 for fluid communication with the corresponding expandable chambers 76a, 76b; 78a, 78b respectively for driving the rotor in clockwise and counterclockwise rotation, respectively in response to fluid pressure selectively delivered through the control system 86 illustrated in FIG. 5.

Figure 8A:
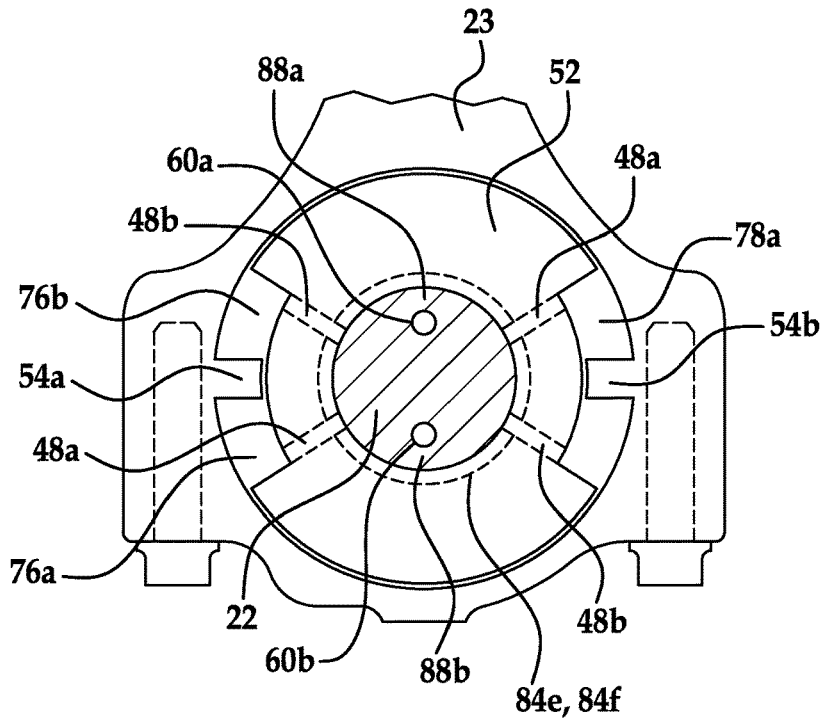
FIG. 8A is a simplified schematic view of a connecting rod having a second end portion associated with a crankpin, where the second end portion supports a hydraulically actuated eccentric rotor for movement between a first angular position and a second angular position to change an effective length of the connecting rod.
Figure 8B:
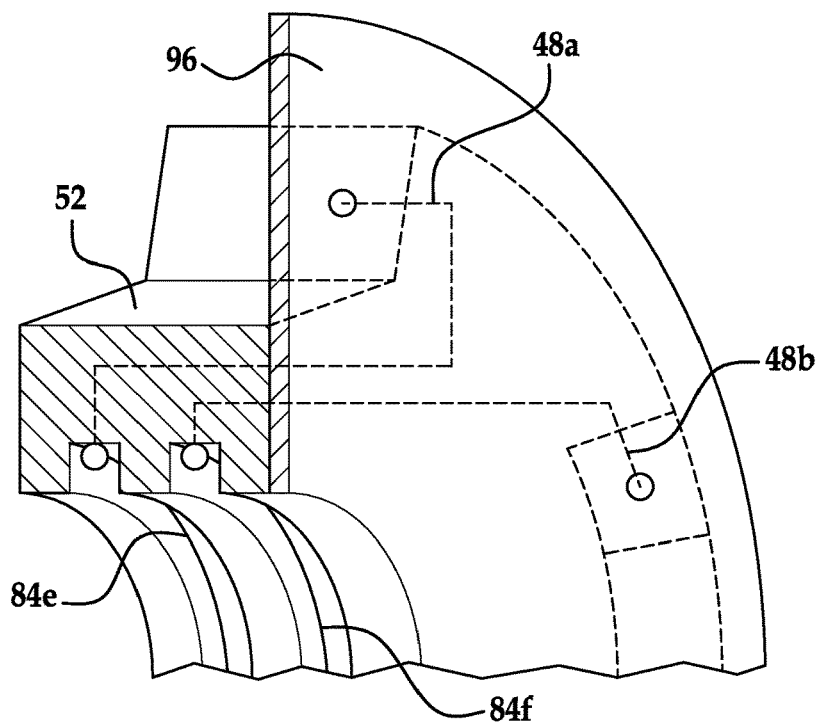
FIG. 8B is a simplified perspective detail view of the eccentric rotor of FIG. 8A having annular grooves or segments providing fluid communication between the crankpin and the first and second expandable fluid chambers for driving the rotor in rotation, and a cover for enclosing the eccentric rotor with respect to the connecting rod.

Referring now to FIGS. 8A-8B, by way of example and not limitation, at least one vane 54a, 54b can be defined by the connecting rod 28. The at least one vane 54a, 54b can be defined by at least one of a piston-pin-receiving aperture at a first end of the connecting rod 28 or a crankpin-receiving aperture at a second end of the connecting rod 28. A first expandable chamber 76a and a second expandable chamber 76b are located on opposite sides of the first vane 54a and enclosed by the eccentric rotor 52 and the first vane 54a. A corresponding pair of first and second expandable chamber 78a, 78b can be located on opposite sides of a second vane 54b. By way of example and not limitation, as illustrated in FIG. 8A, the rotor 52 can rotate counterclockwise in response to fluid pressure expanding the first expandable chambers 76a, 78a and can rotate clockwise in response to fluid pressure expanding the second expandable chambers 76b, 78b. Fluid passages can be provided for selectively pressurizing and expelling fluid from the expandable chambers 76a, 76b; 78a, 78b to rotationally drive the eccentric rotor 52. As illustrated in FIG. 8A, a first fluid passage 48a can be in fluid communication with the first expandable chambers 76a, 78a and a second fluid passage 48b can be in fluid communication with the second expandable chambers 76b, 78b. A first and second radial distance 80, 82 (best seen in FIG. 6) from the rotational axis of the eccentric rotor to an outer eccentric surface area of the eccentric rotor 52 can be driven into alignment with a longitudinal axis of the connecting rod 28 by rotation of the eccentric rotor 52 thereby changing an effective distance between the crankpin axis and the piston pin axis, or the first and second longitudinal axes.

As best illustrated in FIGS. 8A-B, it should be recognized by those skilled in the art that separate, independent, first and second annular grooves 84e, 84f can be formed in an exterior surface of the eccentric rotor 52. The first and second annular grooves 84e, 84f fluidly communicate separately and independently with fluid passages 60a, 60b, 88a, 88b formed in the crankshaft and the first and second fluid passages 48a, 48b respectively formed in the rotor 52 for fluid communication with the corresponding expandable chambers 76a, 76b; 78a, 78b respectively for driving the rotor in rotation in either direction in response to fluid pressure selectively delivered through the control system 86 illustrated in FIG. 5. As illustrated in FIG. 8B, a cover 96 can be mounted against the eccentric rotor 52 enclosing the first and second expandable chambers 76a, 76b; 78a, 78b. By way of example and not limitation, fluid passages 48a, 48b in fluid communication with the corresponding expandable chambers 76a, 76b; 78a, 78b can be defined by passages formed in the cover 96 or by the cover 96 in cooperation with the rotor 52. It should be recognized by those skilled in the art that the cover 96 could be a radially outwardly extending flange formed integrally with the eccentric rotor 52 eliminating the need for a separate cover piece.

Referring now to FIGS. 4A-5B, fluid pressure can selectively be delivered to rotate the eccentric rotor 52 in clockwise and counterclockwise direction by acting on the first and second vanes 54a, 54b. Each of the first and second vanes 54a 54b can define a first expandable chamber 76a, 78a located on one side of the vane and a second expandable chamber 76b, 78b located on the opposite side of the vane. One of the first and second fluid conduit 48a, 48b can deliver pressurized fluid to a corresponding one of the first and second expandable chambers 76a, 76b; 78a, 78b, respectively, while the other of the first and second fluid conduits 48a, 48b can depressurize the other of the first and second expandable chambers 76a, 76b; 78a, 78b to a fluid collection sump for rotating the eccentric rotor 52 in a clockwise or counterclockwise direction. The engine block can define fluid passages 23a, 23b in fluid communication with the crankshaft 20 and the source of pressurized fluid. The fluid passages 23a, 23b can be in fluid communication with the fluid conduits 48a, 48b for fluid communication between the source of pressurized fluid and the expandable chambers 76a, 76b, 78a, 78b through fluid passages 60a, 60b, formed in the crankshaft 20 and connecting passages 88a, 88b formed in the crankpin 22 for communication through annular grooves 84c, 84d formed in the connecting rod 28 as best seen in FIGS. 4A-5B. An engine control unit 90 can send signals to an oil control valve 58 for moving the valve between first and second positions.

Figure 2:
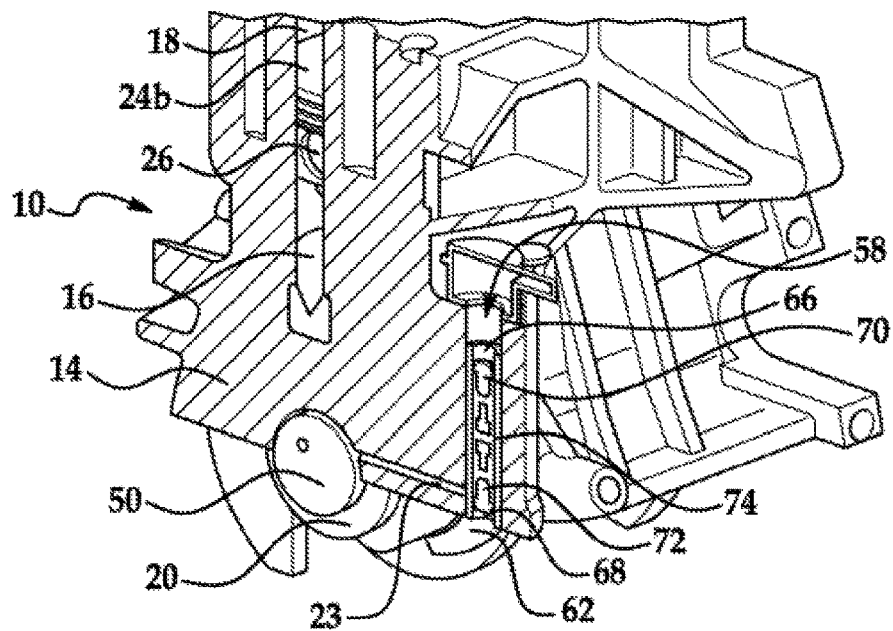
FIG. 2 is a cross sectional view of an internal combustion engine illustrating a control system for actuating angular movement of the eccentric rotor in order to operate a variable compression connecting rod system.

Referring now to FIG. 2, by way of example and not limitation, the oil control valve 58 can include a control valve 58 having an actuator such as a solenoid operated actuator, a piezoelectric operated actuator, or any other mechanically or electrically operated actuator for a control valve 58 for changing between the different valve positions. The valve is in a first position allowing fluid pressure from inlet port 66 to communicate with the first expandable chambers 76a, 78a while venting fluid pressure through outlet port 94a from the second expandable chambers 76b, 78b driving the eccentric rotor 52 in a clockwise direction. When the oil control valve 58 is in a second position, the valve allows fluid pressure from inlet port 66 to communicate with the second expandable chambers 76b, 78b while venting fluid pressure through outlet port 94b from the first expandable chambers 76a, 78a to drive the eccentric rotor 52 in a counterclockwise direction.

Figure 4A:
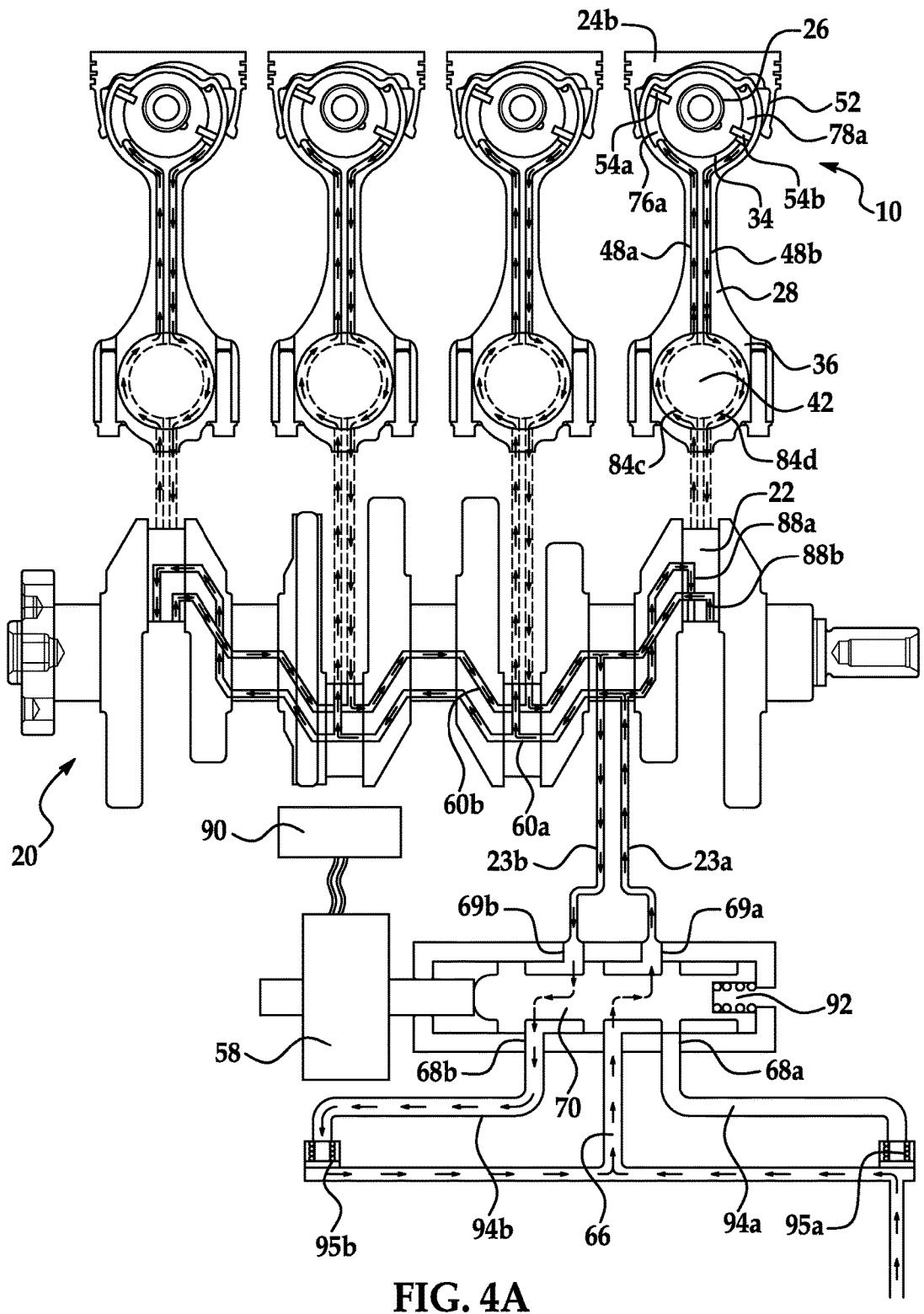
FIG. 4A is a schematic diagram of a pressurized fluid control system for the variable compression connecting rod system illustrating a torque assisted high compression configuration for rotating the hydraulically actuated eccentric rotor in a first direction of rotary movement using a torsional assist hydraulic control system.
Figure 4B:
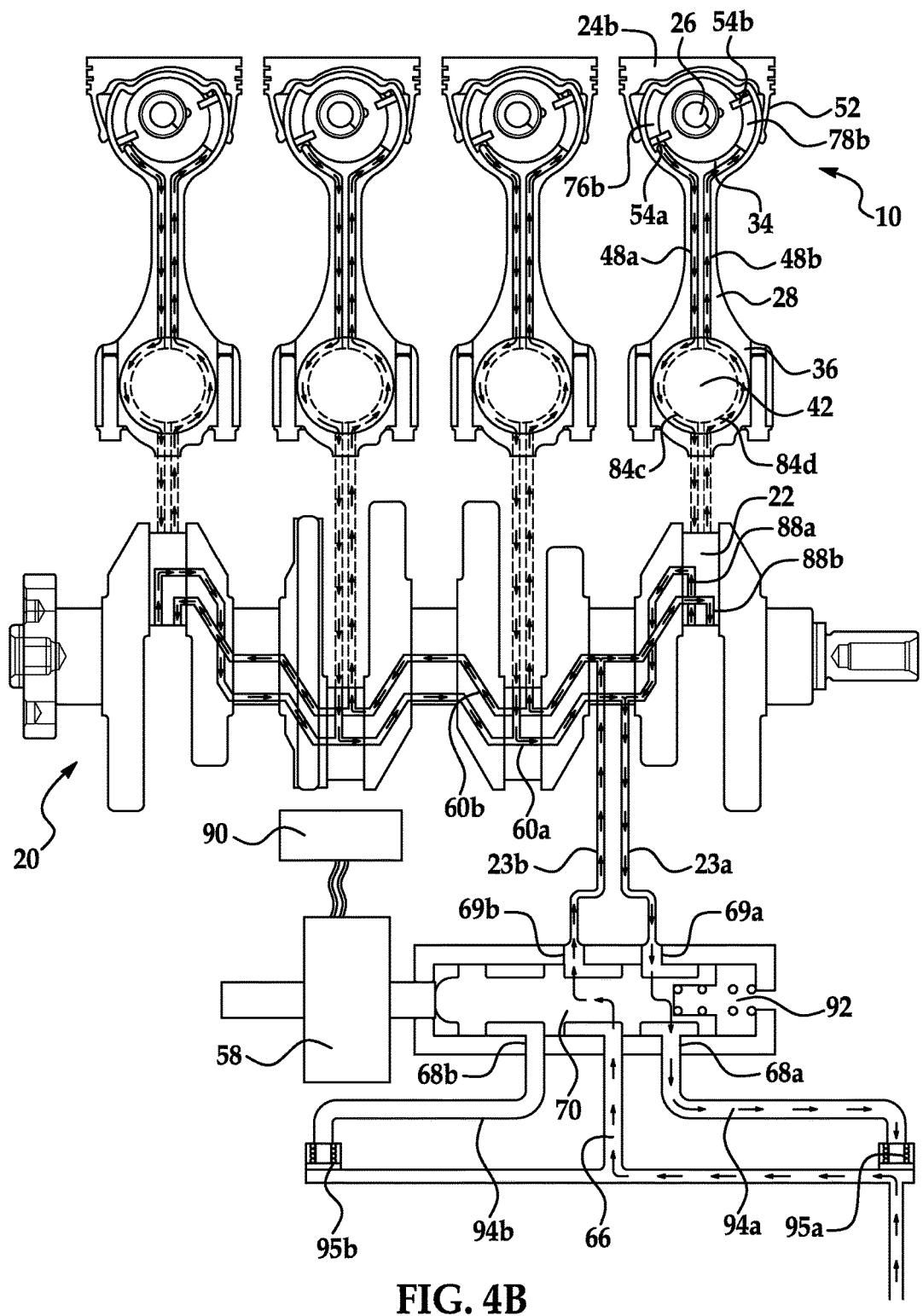
FIG. 4B is a schematic diagram of a pressurized fluid control system for the variable compression connecting rod system illustrating a torque assisted low compression configuration for rotating the hydraulically actuated eccentric rotor in a second direction of rotary movement using a torsional assist hydraulic control system.
Figure 5A:
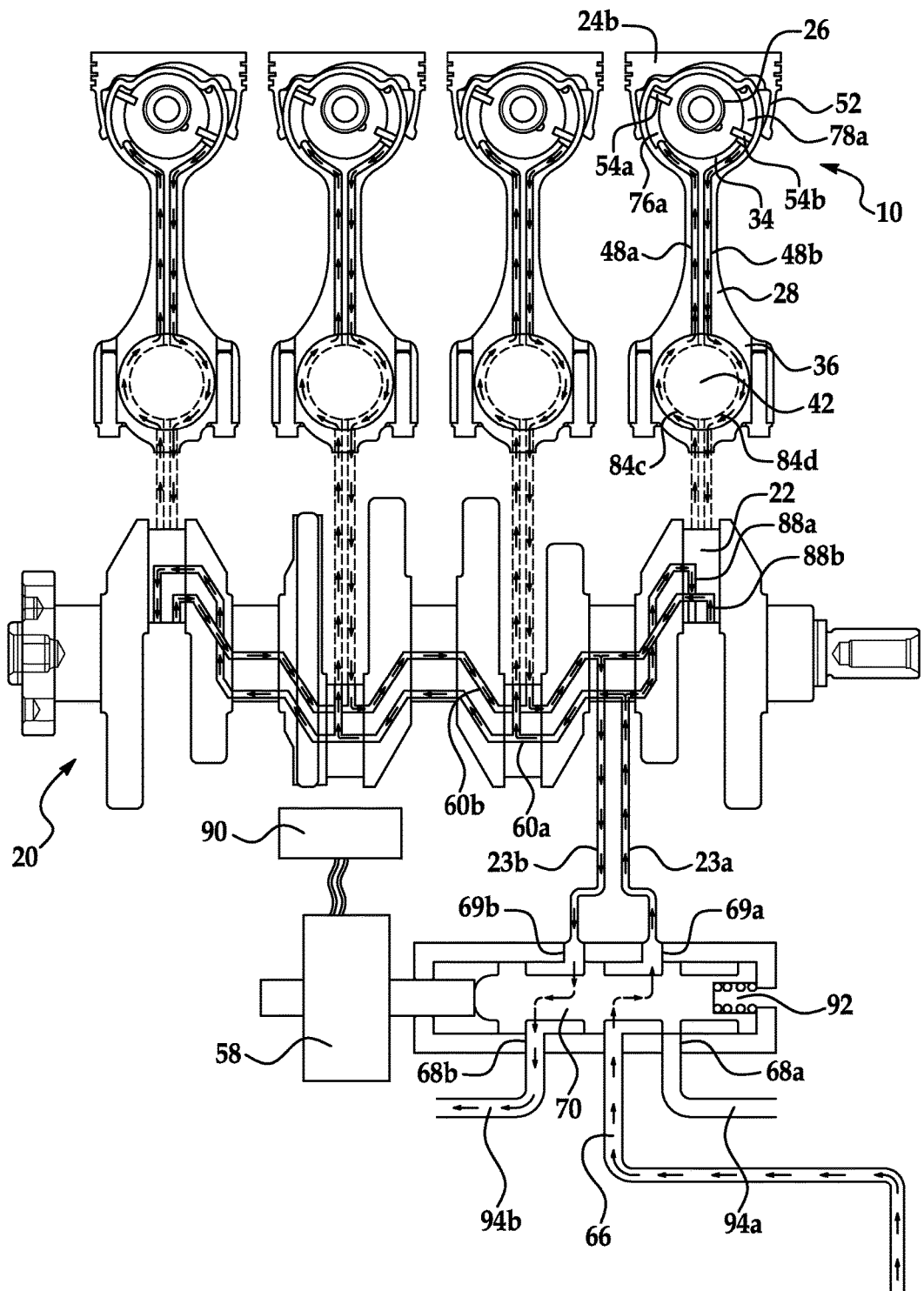
FIG. 5A is a schematic diagram of a pressurized fluid control system for the variable compression connecting rod system illustrating an oil pressure actuated high compression configuration for rotating the hydraulically actuated eccentric rotor in a first direction of rotary movement.
Figure 5B:
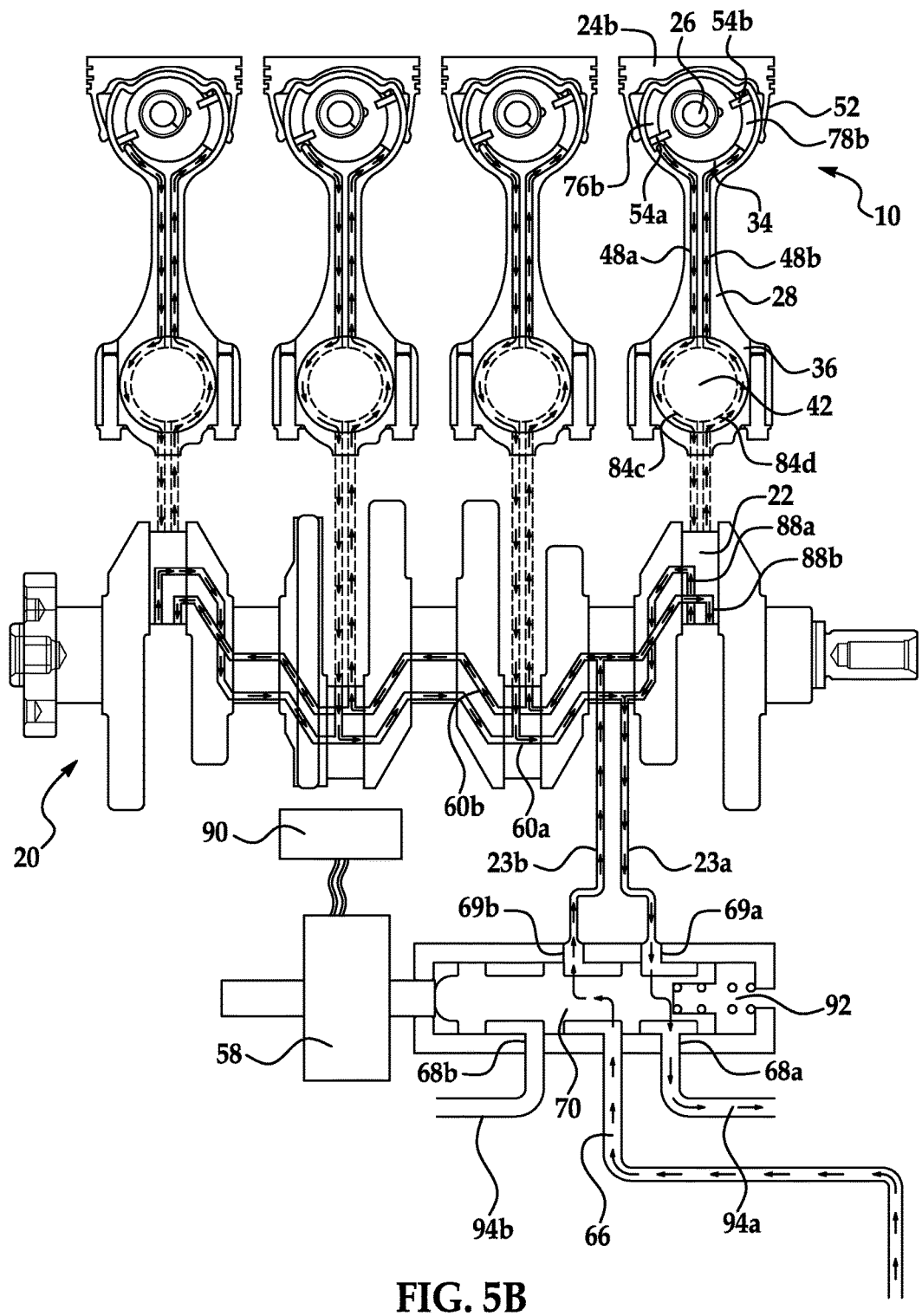
FIG. 5B is a schematic diagram of a pressurized fluid control system for the variable compression connecting rod system illustrating an oil pressure actuated low compression configuration for rotating the hydraulically actuated eccentric rotor in a second direction of rotary movement.

Referring now to FIGS. 2-5B, the control system 86 can include an oil control valve 58, by way of example and not limitation, a control valve 58 having an actuator such as a solenoid operated actuator, a piezoelectric operated actuator, or any other mechanically or electrically operated actuator for a control valve 58 for changing between the different valve positions for controlling rotation of the eccentric rotor 52 and having at least a first position and a second position. The control valve 58 can be in fluid communication between the source of pressurized fluid and the at least one fluid conduit 48a, 48b for selectively providing pressurized fluid to one of the first and second expandable chambers 76a, 76b; 78a, 78b while simultaneously venting fluid pressure from the other of the first and second expandable chambers 76a, 76b; 78a, 78b. Fluid passages 23, 23a, 23b defined through the engine block 14 can be in fluid communication with the fluid conduits 48a, 48b for actuation of the eccentric rotor 52. By way of example and not limitation, as illustrated in FIGS. 4A and 5A, the first valve position can be defined by the oil control valve 58 allowing fluid flow through a spool 70, 72 toward one of the first and second expandable chambers 76a, 76b; 78a, 78b while venting fluid pressure from the other of the first and second expandable chambers 76a, 76b; 78a, 78b for rotation of the eccentric rotor 52. By way of example and not limitation, as illustrated in FIGS. 4B and 5B, a second position can be defined by the spool 70, 72 pressuring and venting fluid pressure from the opposite expandable chambers from the first position. As illustrated in FIG. 2, the oil control valve 58 can have a valve body 74. The valve body 74 can include a fluid inlet 66, a fluid outlet 68, and at least one cylindrical spool 70, 72 in fluid communication between the fluid inlet and outlet 66, 68. The at least one cylindrical spool 70, 72 can be shiftable between a first and second position within the oil control valve 58. A biasing member 92 can be provided for shifting the at least one cylindrical spool 70, 72. When the at least one cylindrical spool 70, 72 is in the first position, the oil control valve 58 can allow fluid flow from source of pressurized fluid through the oil control valve 58 to one of the first and second expandable chambers 76a, 76b; 78a, 78b, while venting the other of the first and second expandable chambers 76a, 76b; 78a, 78b. When the at least one cylindrical spool 70, 72 is in the second position, the oil control valve 58 can allow fluid flow to the other of the first and second expandable chambers 76a, 76b; 78a, 78b, while venting the opposite one of the first and second expandable chambers 76a, 76b; 78a, 78b. A third position of the oil control valve 58 can be provided, if desired, to isolate the eccentric rotor from fluid communication with either of the source of fluid pressure or vent to hold the eccentric rotor in a current position. It is contemplated that the oil control valve 58 can be located in the engine block 14, or can be located in a separate module adapted to be bolted to the engine block 14. As best seen in FIGS. 4A-4B, the variable compression connecting rod system 10 can further include at least one check valve 95a, 95b located between a pressurized fluid source and the valve body 74 for torque assisted operation in at least one direction of actuation, or two check valve 95a, 95b located between a pressurized fluid source and the valve body 74 for torque assisted operation in both directions of actuation. As best seen in FIG. 2, at least one vent 62 can be provided for fluid communication between the oil control valve 58 and the engine block 14.

As illustrated in FIGS. 4A-4B, in a torque actuated or torsional assisted operation to vary a length of the connecting rod 28 in at least one rotational direction, pressurized fluid can pass through at least one check valve 95a, 95b to be in fluid communication with the inlet port 66 of the oil control valve 58 in a torque actuated or torsional assisted control system 86. After the pressurized fluid passes out of one of the outlet ports 68a, 68b through a corresponding fluid passage 94a, 94b and through the corresponding check valve 95a, 95b, the pressurized fluid can enter the fluid inlet port 66 of the oil control valve 58. When the at least one cylindrical spool 70 is shifted into the first position allowing for fluid flow from through the oil control valve 58, the pressurized fluid can flow through one of the fluid ports 69a, 69b and into a corresponding fluid passage 23a, 23b defined by the engine block 14 in fluid communication with a corresponding fluid passage 60a, 60b formed in the crankshaft 20. From fluid passage 60a, 60b, the fluid travels in fluid communication through corresponding fluid passage 88a, 88b and annular groove 84c, 84d formed in the connecting rod 28 for fluid communication with a corresponding fluid passage 48a, 48b. The pressurized fluid can flow into a corresponding one of the first and second chambers 76a, 76b; 78a, 78b defined by the first and second vanes 54a, 54b in fluid communication with the fluid passage 48a, 48b. The pressurized fluid can rotate the eccentric rotor 52 by acting on the first and second vanes 54a, 54b within the corresponding expandable chambers 76a, 76b; 78a, 78b being pressurized to align the desired radial distance 80, 82 of the eccentric rotor 52 with a longitudinal axis of the connecting rod 28. By way of example and not limitation, as illustrated in FIG. 4A, the eccentric rotor 52 can be rotated into a first rotor position such that the first radial distance 82 of the eccentric rotor provides a maximum distance between the first longitudinal axis of the piston pin 26 and the second longitudinal axis of the crankpin 22. By way of example and not limitation, as illustrated in FIG. 4B, the eccentric rotor 52 can be rotated into a second rotor position such that the second radial distance 80 of the eccentric rotor provides a minimum distance between the first longitudinal axis of the piston pin 26 and the second longitudinal axis of the crankpin 22.

In a torque actuated or torsional assisted operation, a combination of torsional energy and standard engine oil pressure can be used to actuate the rotor of the connecting rod for movement toward a minimum length or a maximum length of the connecting rod. It should be recognized that the torsional energy can be captured and used in one direction, or both directions of actuation if desired. In torque actuated or torsional assisted actuation, working fluid is circulated from the fluid chamber being compressed and directed toward the fluid chamber to be expanded. The fluid flows in response to fluid pressure differences generated as a result of the rotational movement or torsional forces acting on the two fluid chambers. The control valve is operated with proper timing to place the two fluid chambers in fluid communication with one another when the torque or torsional generated fluid pressure differences are sufficient to drive fluid from the one chamber to be compressed toward the other chamber to be expanded. The timing and operation of a control valve for similar torque actuated or torsional assist devices used for camshaft phasers are generally known to those skilled in the art, and further explanation of the details of operation of a control valve to achieve torque actuation or torsional assist operation can be found in U.S. Pat. No. 8,561,583; U.S. Pat. No. 8,146,551; U.S. Pat. No. 7,255,077; U.S. Pat. No. 6,997,150; U.S. Pat. No. 6,772,721; U.S. Published Application No. 2013/0206088; U.S. Published Application No. 2013/0180486; and U.S. Published Application No. 2006/0086332 which are incorporated by reference herein in their entirety.

As illustrated in FIGS. 5A-5B, the control system 86 can provide oil pressure actuated operation to varying a length of the connecting rod 28. When the at least one cylindrical spool 70 is shifted into the first position allowing for fluid flow from through the oil control valve 58, the pressurized fluid can flow through one of the fluid ports 69a, 69b and into the at least one fluid passage 23a, 23b defined by the engine block 14 to the fluid passages 60a, 60b formed in the crankshaft 20 and into the fluid passages 88a, 88b and annular grooves 84a, 84b formed in the crankpin 22 for fluid communication with the fluid passages 48a, 48b. The pressurized fluid can flow into a corresponding one of the first and second chambers 76a, 76b; 78a, 78b defined by the first and second vanes 54a, 54b. The pressurized fluid can rotate the eccentric rotor 52 by acting on the first and second vanes 54a, 54b within the corresponding expandable chambers 76a, 76b; 78a, 78b being pressurized to align the desired radial distance 80, 82 of the eccentric rotor 52 with a longitudinal axis of the connecting rod 28. By way of example and not limitation, as illustrated in FIG. 5A, the eccentric rotor 52 can be rotated into a first rotor position such that the first radial distance 82 of the eccentric rotor provides a maximum distance between the first longitudinal axis of the piston pin 26 and the second longitudinal axis of the crankpin 22. By way of example and not limitation, as illustrated in FIG. 5B, the eccentric rotor 52 can be rotated into a second rotor position such that the second radial distance 80 of the eccentric rotor provides a minimum distance between the first longitudinal axis of the piston pin 26 and the second longitudinal axis of the crankpin 22.

It should be recognized that a plurality of connecting rods 28 are provided in the variable compression connecting rod system 10 illustrated in FIGS. 4A-5B and that each of the plurality of connecting rods 28 operate in accordance with the description disclosed herein. As illustrated in FIGS. 4A-4B, the control system 86 can include a first check valve 95a and a second check valve 95b for providing a torque assisted system. The torque assisted system can move pressurized fluid between the expandable chambers 76a, 76b; 78a, 78b for assisting actuation of the rotor 52 to supplement or replace pressurized fluid from a fluid source in one rotational direction or both rotational directions. A fluid source or pump can provide additional pressurized fluid to the system for rotational actuation of the rotor 52 and/or for accommodating any fluid loss in the system. The rotational motion of the connecting rod 28 with respect to the eccentric rotor 52 can transfer hydraulic pressure generated by torque or torsional energy through the variable compression connecting rod system 10 by allowing fluid flow from an expandable chamber 76a, 76b; 78a, 78b having high pressure to another expandable chamber 76a, 76b; 78a, 78b having a lower pressure. The variable compression connecting rod system 10 can be a substantially closed fluid circuit allowing the pressurized fluid to re-circulate through the expandable chambers 76a, 76b; 78a, 78b for rotating the eccentric rotor 52 between the first and second angular positions. The first and second check valve 95a, 95b can be in fluid communication with the corresponding expandable chambers 76a, 76b; 78a, 78b through the additional fluid passages 48a, 48b, 94a, 94b. The first and second check valve 95a, 95b block oil pressure pulses due to torque reversals from propagating back into the oil system and can prevent the at least one vane 54a, 54b from moving in an opposite direction from the direction of the pressurized fluid due to torque reversals. By way of example and not limitation, FIG. 4A illustrates the eccentric rotor 52 rotated in a clockwise direction when the first check valve 95b allows fluid flow from the expandable chamber 76a; 78a toward expandable chamber 76b; 78b. FIG. 4B illustrates the eccentric rotor 52 rotated in a counterclockwise direction when the first check valve 95a allows fluid flow from the expandable chamber 76b; 78b toward expandable chamber 76a; 78.

As illustrated in FIG. 3, the eccentric rotor 52 can be rotated into a second rotor position such that the second radial distance 82 of the eccentric rotor can provide a maximum distance between the first and second longitudinal axis. The first end portion 34 can be operable for reciprocal movement within the at least one cylinder 16 and engageable with the underside surface 24c of the corresponding piston 24 for movement with the piston 24. Changing the minimum and maximum length of the connecting rod 28 effects the effective travel distance of the corresponding piston 24 within the cylinder 16 and can provide for varying compression ratios within the combustion chamber 18. Varying the compression ratio of the piston 24 by providing for two or more positions of travel of the corresponding piston 24 can increase efficiency of the internal combustion engine 12.

By way of example and not limitation, the first and second vane 54a, 54b can be used for a variable compression ratio system having two positions of the corresponding piston 24 within the corresponding cylinder 16. It should be recognized that the vanes 54a, 54b can be driven between first and second angular end limits of travel with respect to the connecting rod 28, or can be selectively controlled at any desired position between the first and second angular end limits of travel to provide for a variable compression ratio having more than two values. The first rotor position can provide a first compression ratio and the second rotor position can provide a second compression ratio. The first compression ratio can be defined by a ratio between a volume of the combustion chamber 18 of the cylinder 16 when the corresponding piston 24 is at a first end limit position of travel with respect to the cylinder 16 and the volume of the combustion chamber 18 when the corresponding piston 24 is at an second end limit position of travel within the cylinder 16.

A method of assembling a variable compression connecting rod system 10 can include forming a connecting rod 28 with a piston-pin-receiving aperture at a first end, a crank-pin-receiving aperture at a second end, and an eccentric-rotor-receiving aperture adjacent at least one of the first and second ends, inserting at least one hydraulically actuated eccentric rotor 52 within the aperture formed in the connecting rod 28. The hydraulically actuated eccentric rotor 52 can be rotatable about at least one of the first and second longitudinal axes having at least one vane 54a, 54b defining first and second expandable chambers extending between the connecting rod 28 and the at least one vane 54a, 54b. Fluid passages can be formed for communication of fluid pressure with the first and second expandable chambers for driving the eccentric rotor in rotation between first and second angular positions for varying a length of the connecting rod 28 between the first and second longitudinal axes. The connecting rod 28 can have a first end 30 to be associated with a piston pin 26 and a second end 32 located distally opposite the first end 30 to be associated with a crankpin 22. The eccentric rotor 52 can be associated with at least one of the first and second end 30, 32 and operable in response to fluid communication with at least one expandable chamber 76a, 76b; 78a, 78b defined between at least one vane 54a, 54b of the eccentric rotor 52 and the connecting rod 28 for rotating the eccentric rotor 52. The eccentric rotor 52 can have different radial distances 80, 82 rotatable into alignment with the longitudinal axis of the connecting rod in response to fluid pressure acting on the at least one vane 54a, 54b for varying an effective distance of a length of the connecting rod between the first and second longitudinal axes. The at least one fluid conduit 48a, 48b can be provided for fluid communication between the at least one expandable chamber 76a, 76b, 78a, 78b and the source of pressurized fluid. The method can further include positioning at least one oil control valve 58 for fluid communication with the at least one expandable chamber 76a, 76b; 78a, 78b and the source of pressurized fluid. By way of example and not limitation, a control valve 58 can have an actuator, such as a solenoid operated actuator, a piezoelectric operated actuator, or any other mechanically or electrically operated actuator for a control valve 58 for changing between the different valve positions The at least one oil control valve 58 can allow fluid communication with the at least one expandable chamber 76a, 76b; 78a, 78b, while venting fluid pressure for the opposite expandable chamber 76a, 76b; 78a, 78b in first position and can allow fluid communication with the opposite expandable chamber 76a, 76b; 78a, 78b, while venting the other expandable chamber 76a, 76b; 78a, 78b when in the second position.

The variable connecting rod length can improve fuel efficiency by five percent (5%) to ten percent (10%). A variable connecting rod length permits an internal combustion engine to be multi-fuel capable. A hydraulically actuated rotor mounted internally with respect to the connecting rod allows a hydraulic control system to use torsional energy to actuate, or to include a two-way control valve, or to include a multi-way oil control valve, or to include an oil control valve having an internal check valve 95a, 95b assembly. No linkage is required to rotate the eccentric rotor mounted within the connecting rod. A hydraulic rotary actuator centered on-axis with the crankpin or piston pin bore can be used to directly rotate the eccentric rotor in order to vary the effective length of the connecting rod between the two pin bores. In addition, the rotary actuator operates similar in principle to a cam phaser and can be controlled by an oil control valve communicating with a hydraulic circuit in the actuator through passages in the crankshaft and crankpin.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A variable compression connecting rod system having a piston pin defining a first longitudinal axis, a crankpin of a crankshaft defining a second longitudinal axis, and a source of pressurized fluid, the improvement comprising:
    a connecting rod having a first end to be associated with the piston pin and a second end located distally opposite the first end and to be associated with the crankpin;
    a hydraulically actuated eccentric rotor rotatable about at least one of the first and second longitudinal axes associated with at least one of the first and second ends, the eccentric rotor operable in response to fluid communication with at least one expandable chamber defined between the eccentric rotor and the connecting rod for rotating the eccentric rotor between first and second angular positions, the eccentric rotor having an eccentric surface area with different first and second radial distances and rotatable in response to fluid pressure acting on the eccentric rotor for varying a distance between the first and second longitudinal axes, the first radial distance corresponding to a minimum connecting rod length and the second radial distance corresponding to a maximum connecting rod length,
    wherein the eccentric rotor includes a first vane and a second vane disposed on an exterior surface of the eccentric rotor, each of the first and second vanes defining a first expandable chamber and a second expandable chamber, respectively, located on opposite sides of a corresponding vane, the eccentric rotor rotatable in a clockwise direction and a counterclockwise direction in response to fluid pressure acting against the first and second vanes within the corresponding first and second expandable chambers and wherein the first vane and the second vane are approximately 180° apart; and
    at least one oil control valve (58) having a position to isolate the eccentric rotor from fluid communication with the source of pressurized fluid or a vent to hold the eccentric rotor in a current position.

2. The improvement of claim 1, wherein the connecting rod includes a first end portion located at the first end mountable for rotation with respect to the piston pin, and a second end portion located at the second end mountable for rotation with respect to the crankpin, each of the first and second end portions defining an aperture.

3. The improvement of claim 1 further comprising:
    a torsional assist hydraulic control system for assisting rotary movement of the eccentric rotor in at least one direction of rotation.

4. The improvement of claim 3, wherein the eccentric rotor is associated with the first end and mountable for rotation with respect to the piston pin, the eccentric rotor independently rotatable with respect to the piston pin.

5. The improvement of claim 4, further comprising:
    at least one fluid conduit in fluid communication between at least one of the first expandable chamber and the second expandable chamber and at least one fluid passage defined by the crankshaft through fluid passages formed in the crankpin and annular grooves formed in the connecting rod.

6. The improvement of claim 3, wherein the eccentric rotor is associated with the second end and mountable for rotation with respect to the crankpin, the eccentric rotor independently rotatable with respect to the crankpin.

7. The improvement of claim 6, further comprising:
    at least one fluid conduit in fluid communication between at least one of the first expandable chamber and the second expandable chamber and at least one fluid passage defined by the crankshaft through the crankpin, the at least one fluid conduit in fluid communication with the at least one fluid passage through annular grooves formed in the eccentric rotor.

8. The improvement of claim 1 wherein the at least one oil control valve selectively allows fluid communication between the at least one of the first expandable chamber and the second expandable chamber and the source of pressurized fluid, the at least one oil control valve operable in a first position and a second position for selectively driving the eccentric rotor in clockwise and counterclockwise rotation.

9. A variable compression connecting rod system having a piston pin defining a piston pin axis, a crankpin of a crankshaft defining a crankpin axis, and a source of pressurized fluid, the improvement comprising:
    a connecting rod having a first end associated with the piston pin and a second end located distally opposite the first end and associated with the crankpin;
    a hydraulically actuated eccentric rotor rotatable about at least one of the piston pin axis and the crankpin axis associated with at least one of the first and second ends between first and second angular positions, the eccentric rotor and the connecting rod defining a first expandable chamber and a second expandable chamber, the eccentric rotor having different first and second radial distances aligned with a longitudinal axis of the connecting rod when in the first and second angular positions for varying a longitudinal length of the connecting rod between the piston pin axis and the crankpin axis, the first radial distance corresponding to a minimum connecting rod length and the second radial distance corresponding to a maximum connecting rod length;
    at least one fluid conduit allowing fluid communication between the first and second expandable chamber and the source of pressurized fluid,
    wherein the eccentric rotor includes a first vane and a second vane disposed on an exterior surface of the eccentric rotor, each of the first and second vanes defining the first expandable chamber and the second expandable chamber, respectively, located on opposite sides of a corresponding vane, the eccentric rotor rotatable in a clockwise direction and a counterclockwise direction in response to fluid pressure acting against the first and second vanes within the corresponding first and second expandable chambers and wherein the first vane and the second vane are approximately 180° apart; and at least one oil control valve having a position to isolate the eccentric rotor from fluid communication with the source of pressurized fluid or a vent to hold the eccentric rotor in a current position.

10. The improvement of claim 9, wherein the eccentric rotor is associated with the first end and mountable with respect to the piston pin, the eccentric rotor independently rotatable with respect to the piston pin, the at least one fluid conduit defined within the connecting rod and extending between the first end and the second end.

11. The improvement of claim 9, wherein the eccentric rotor is associated with the second end and mountable with respect to the crankpin, the eccentric rotor independently rotatable with respect to the crankpin.

12. The improvement of claim 9 further comprising:
a torsional assist hydraulic control system for assisting rotary movement of the rotor in at least one direction of rotation.

13. A method of assembling a variable compression connecting rod system comprising:
forming a connecting rod to be mountable with respect to a piston pin and a crankpin, the connecting rod having a first end to be associated with the piston pin defining a piston pin axis and a second end located distally opposite the first end to be associated with the crankpin defining a crankpin axis, the connecting rod having an eccentric-rotor-receiving aperture formed therein;

inserting at least one hydraulically actuated eccentric rotor to be rotatable about at least one of the piston pin and crankpin axes associated with at least one of the first and second ends, the eccentric rotor operable in response to fluid communication with at least one expandable chamber defined between the eccentric rotor and the connecting rod for rotating the eccentric rotor, the eccentric rotor having different first and second radial distances movable into alignment with a longitudinal axis of the connecting rod in response to fluid pressure action acting on the eccentric rotor for varying a longitudinal length of the connecting rod between the piston pin and crankpin axes, the first radial distance corresponding to a minimum connecting rod length and the second radial distance corresponding to a maximum connecting rod length;

forming at least one fluid conduit allowing fluid communication between the at least one expandable chamber and a source of pressurized fluid, forming a first vane and a second vane on an exterior surface of the eccentric rotor, each of the first and second vanes defining the first expandable chamber and the second expandable chamber, respectively, located on opposite sides of a corresponding vane, wherein the eccentric rotor is rotatable in a clockwise direction and a counterclockwise direction in response to fluid pressure acting against the first and second vanes within the corresponding first and second expandable chambers and wherein the first vane and the second vane are approximately 180° apart; and inserting at least one oil control valve having a position to isolate the eccentric rotor from fluid communication with the source of pressurized fluid or a vent to hold the eccentric rotor in a current position.

14. The method of claim 13 further comprising:
positioning at least one oil control valve in fluid communication between the at least one pair of first and second expandable chambers and the source of pressurized fluid, the oil control valve allowing fluid communication with one of the first and second expandable chambers while venting an opposite one of the first and second expandable chambers in a first position, the oil control valve allowing fluid communication between the opposite one of the first and second expandable chambers while venting the one of the first and second expandable chambers in a second position.

* * * * *